Heine & Prussing
Axle Box.
No. 33,992. Patented Dec. 24, 1861.
Fig. 1.
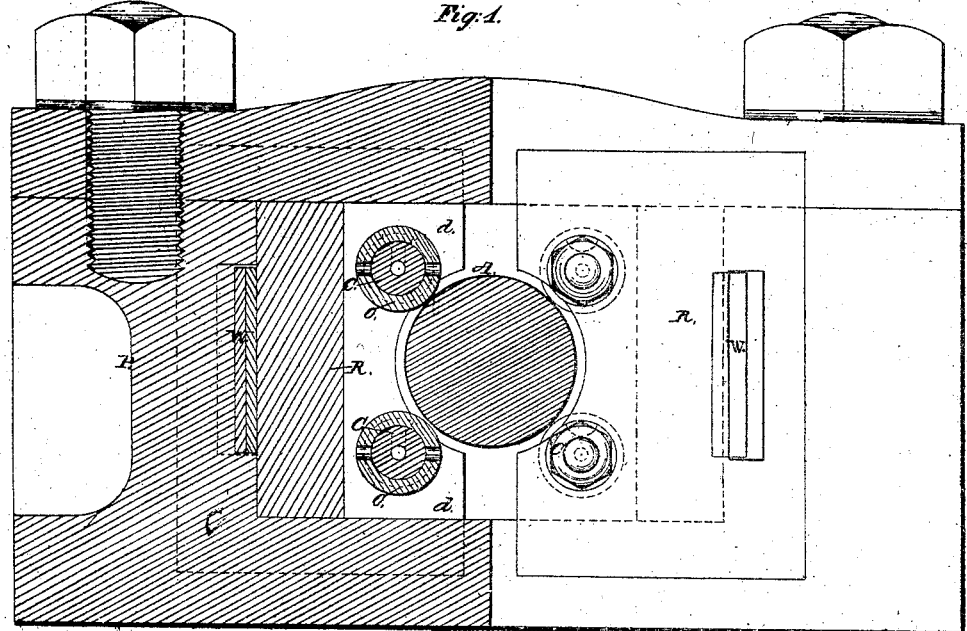
Fig. 2.
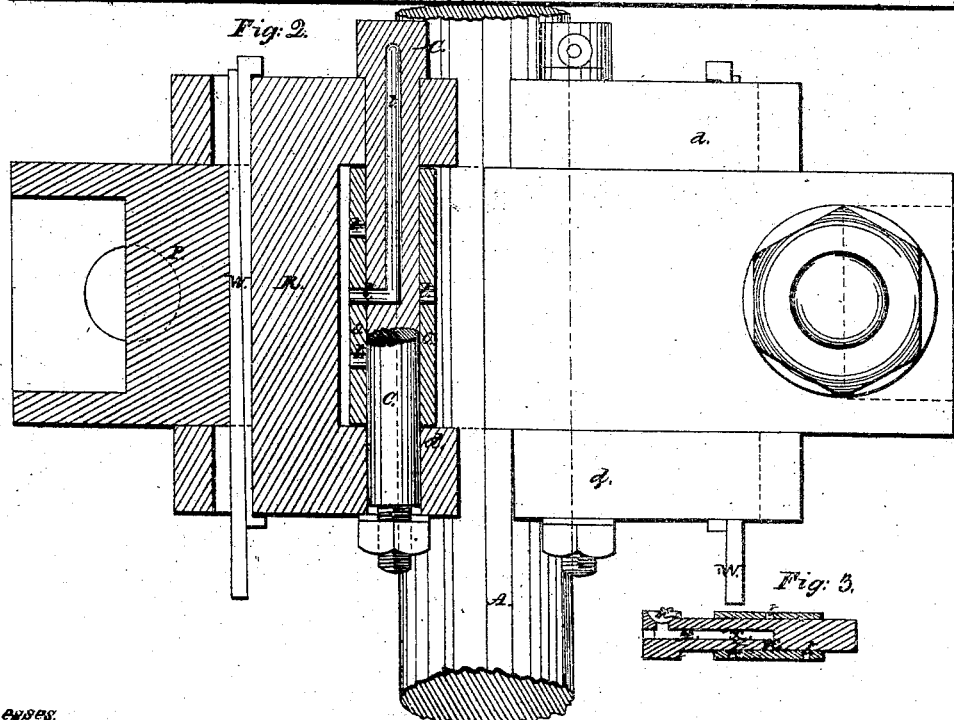
Fig. 3.
Witnesses:
Inventors:
Otto L. Heine
Ernst Prussing

UNITED STATES PATENT OFFICE.

O. T. L. HEINE AND E. PRUSSING, OF CHICAGO, ILLINOIS.

JOURNAL-BOX.

Specification of Letters Patent No. 33,992, dated December 24, 1861.

*To all whom it may concern:*

Be it known that we, OTTO THEODORE LUDWIG HEINE and ERNST PRUSSING, of Chicago, in the county of Cook and State of Illinois, have invented a new and Improved Mode of Constructing Journal-Boxes; and we do hereby declare that the following is a full and exact description thereof, reference being had to the annexed drawings, making a part of this specification, in which—

Figure 1 is a vertical section and side elevation. Fig. 2, a horizontal section and plan of the journal box. Fig. 3 is a longitudinal section of the friction roller and friction roller bolt.

The nature of our invention consists in using the anti-friction rollers in connection with a system of wedging, for the purpose to take up any lost motion caused by the wear and tear of the antifriction rollers and the shaft or pinion etc. and in the peculiar arrangement to oil the antifriction rollers and the shaft or pinion etc.

To enable others skilled in the art to make and use our invention, we will proceed to describe its construction and operation.

We construct our journal box (with reference to the general features) in any of the known forms, but apply thereto anti-friction rollers and wedges.

We refer now to Fig. 1: The letter P, represents the pedestal for the reception of the anti-friction roller boxes R, R with their flanches $d$, $d$, the latter receiving the bolts $c$, $c$, $c$, $c$, upon which the antifriction-rollers $v$, $v$, $v$, $v$, turn freely. The shaft or pinion A passes transversely through the antifriction roller boxes R, R or what is the same parallel to the friction roller bolts $c$, $c$, $c$, $c$. A wedge W placed behind each roller box R, therefore between each roller box R and the pedestal P, (see Fig. 1,) when driven at their thick ends toward the roller boxes R, R, will cause the latter to move to the shaft or pinion A, and holding thereby shaft or pinion A steady. This system of wedging has not only the advantage to take up all lost motion between shaft or pinion A and the rollers $v$, $v$, $v$, $v$, but also that, to keep the shaft or pinion A always in its true place; considering in connection with the just mentioned, the free spaces around the shaft or pinion A, friction must naturally be diminished in a high degree.

The heating of a journal or pinion becomes impossible especially when the oiling of the shaft or pinion A and the antifriction rollers $o$, $o$, $o$, $o$, is such as adopted by us. See Fig. 3. A passage $x$, $x$, $x$, $x$, is drilled or cut through the friction roller-bolts $c$, by means of which the oil (the latter being poured into the opening $x$ in the head of the bolt $c$,) enters the friction rollers $o$, and as there are holes or passages $t$, $t$, $t$, $t$, are cut or drilled through the friction-rollers $o$, $o$, $o$, $o$, $o$ the oil will also be conducted to the shaft or pinion A. The little block $m$, which closes the oil passage $x$ at the roller bolt head has the object, to facilitate the cleaning of the oil passage $x$, $x$, $x$, $x$.

What we claim as our invention and desire to secure by Letters Patent, is:

The construction of friction or anti-friction rollers with holes or passages cut or drilled through them for the purpose of receiving and distributing oil or other lubricating material, upon the shaft, axle, pinion and rollers, in combination with the peculiar mode of wedging in the manner and for the purposes herein described.

OTTO T. L. HEINE.
ERNST PRUSSING.

Witnesses:
C. W. THEODORE VERAUSCH,
HENRY FARWELL.